US006336154B1

(12) United States Patent
McCarthy et al.

(10) Patent No.: US 6,336,154 B1
(45) Date of Patent: Jan. 1, 2002

(54) METHOD OF OPERATING A COMPUTER SYSTEM BY IDENTIFYING SOURCE CODE COMPUTATIONAL ELEMENTS IN MAIN MEMORY

(75) Inventors: Dominic Paul McCarthy, Chipping Sodbury; Stuart Victor Quick, Chalfont St Peter, both of (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/599,030

(22) Filed: Jun. 20, 2000

Related U.S. Application Data

(62) Division of application No. 09/003,526, filed on Jan. 6, 1998.

(30)  Foreign Application Priority Data

Jan. 9, 1997  (EP) ............................................ 97300113
Nov. 11, 1997  (GB) ............................................. 9723704

(51) Int. Cl.$^7$ ............................. G06F 9/45; G06F 13/28
(52) U.S. Cl. ............................... 710/35; 710/1; 710/66;
710/107; 710/110; 711/1; 711/117; 711/131;
711/140; 711/150; 712/9; 712/34; 717/8;
717/9
(58) Field of Search ............................. 710/1, 107, 110,
710/35, 66; 717/8, 9; 711/1, 117, 131, 140,
150; 212/9, 34

(56)  References Cited

U.S. PATENT DOCUMENTS 4,099,236 A   7/1978  Goodman et al. .......... 710/110
4,589,067 A   5/1986  Porter et al. ................... 712/9

(List continued on next page.)

FOREIGN PATENT DOCUMENTS

EP   0 021 365   1/1981
EP   0 447 145   9/1991

(List continued on next page.)

OTHER PUBLICATIONS

Messias, et al., "Team An Array Processor with a $\mu$P for Super Performance in Data Comm.," 2328 Electronic Design, vol. 28, No. 8 (Apr. 1980) pp. 115–120.

(List continued on next page.)

Primary Examiner—Thomas Lee
Assistant Examiner—Tammara Peyton

(57)  ABSTRACT

A computer system comprises: a processing system for processing data; a memory for storing data processed by, or to be processed by, the processing system; a memory access controller for controlling access to the memory; and at least one data buffer for buffering data to be written to or read from the memory. A burst controller is provided for issuing burst instructions to the memory access controller, and the memory access controller is responsive to such a burst instruction to transfer a plurality of data words between the memory and the data buffer in a single memory transaction. A burst instruction queue is provided so that such a burst instruction can be made available for execution by the memory access controller immediately after a preceding burst instruction has been executed. Each such burst instruction includes or is associated with a parameter defining a spacing between locations in the memory to be accessed in response to that burst instruction, and the memory access controller is responsive to such a burst instruction to transfer a plurality of data elements between the memory, at locations spaced in accordance with the spacing parameter, and the data buffer in a single memory transaction. The system is particularly applicable for processing media which has high spatial locality and regularity, but low temporal locality, and enables high performance to be extracted from cheap memory.

9 Claims, 7 Drawing Sheets

U.S. PATENT DOCUMENTS

Figure 1:
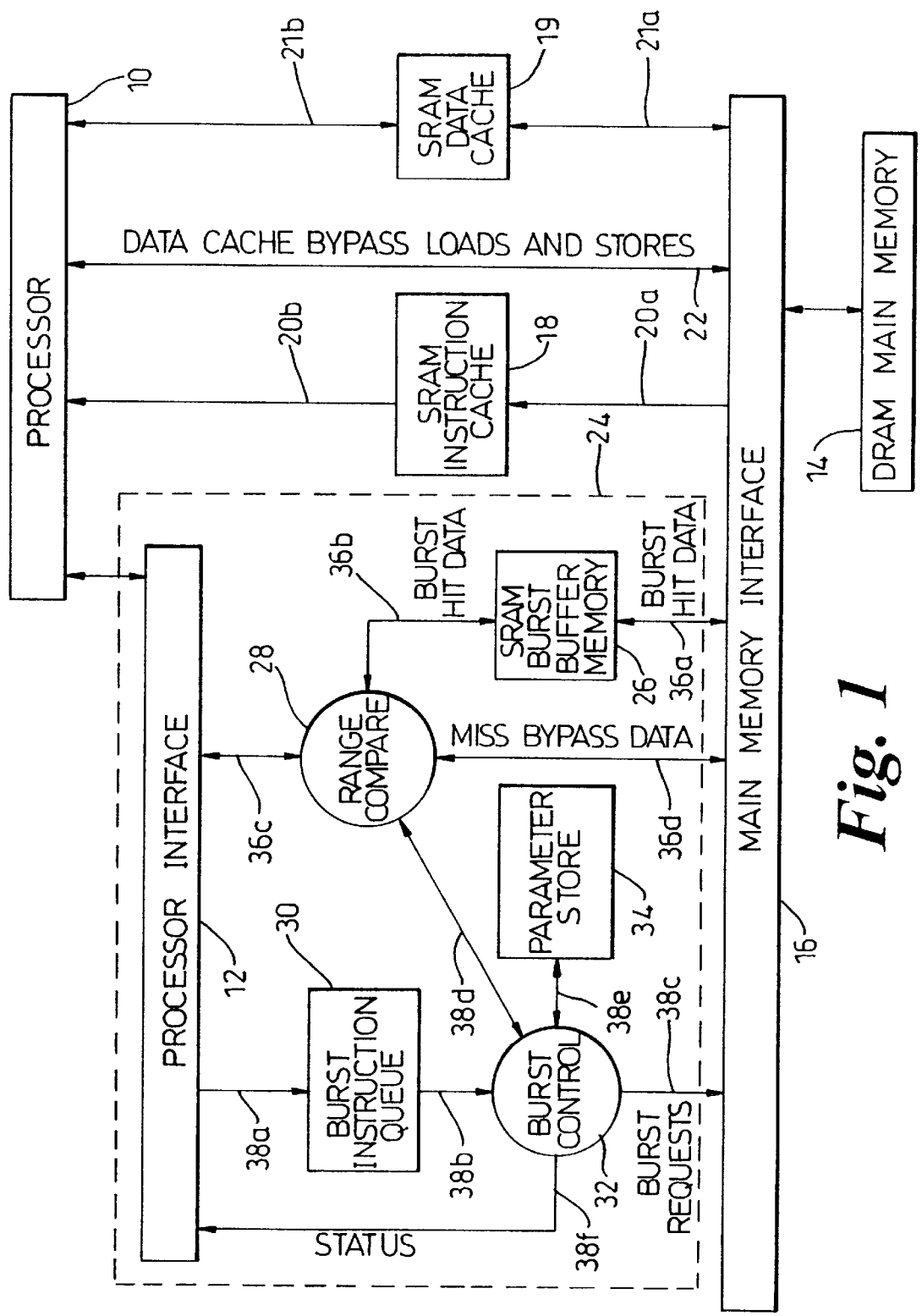

| | | | | |
|---|---|---|---|---|
| 5,121,498 | A | * | 6/1992 | Gilbert et al. .................. 717/8 |
| 5,537,620 | A | * | 7/1996 | Breternitz, Jr. ................ 717/9 |
| 5,590,307 | A | | 12/1996 | McClure ..................... 711/131 |
| 5,603,007 | A | | 2/1997 | Yazdy et al. ................ 711/140 |
| 5,627,994 | A | | 5/1997 | Levy et al. ................. 711/150 |
| 5,708,830 | A | | 1/1998 | Stein ........................... 712/34 |
| 5,784,582 | A | | 7/1998 | Hughes ...................... 710/117 |
| 5,860,027 | A | | 1/1999 | Leyrer ......................... 710/66 |
| 5,862,385 | A | * | 1/1999 | Iitsuka .......................... 717/9 |
| 5,884,050 | A | | 3/1999 | Wheeler et al. ............ 710/107 |
| 6,006,289 | A | | 12/1999 | James et al. ................. 710/35 |
| 6,009,493 | A | | 12/1999 | Fujiyama ...................... 711/1 |
| 6,049,839 | A | * | 4/2000 | Fujii et al. ..................... 710/1 |
| 6,085,261 | A | | 7/2000 | McIntyre, Jr. et al. ........ 710/35 |
| 6,209,071 | B1 | | 3/2001 | Barth et al. ................. 711/167 |

FOREIGN PATENT DOCUMENTS

| | | |
|---|---|---|
| EP | 0 549 924 | 7/1993 |
| EP | 0 581 698 | 2/1994 |
| EP | 0 853 283 | 7/1998 |
| GB | 2 250 615 | 6/1992 |
| JP | 402250137 | * 10/1990 |
| JP | 402250138 | * 10/1990 |
| WO | 91 11767 | 8/1991 |

OTHER PUBLICATIONS

Hennessy, John L., et al. "Computer Architecture A Quantitative Approach", Morgan Kaufman Publishers, Inc., pp. 414–416, 444–445, and 475–478 (1990).

Handy, Jim, The Cache Memory Book, Academic Press, pp. 9 and 12–22 (1990).

* cited by examiner

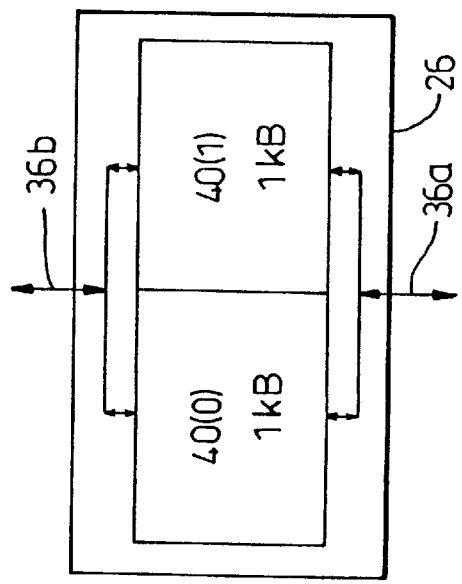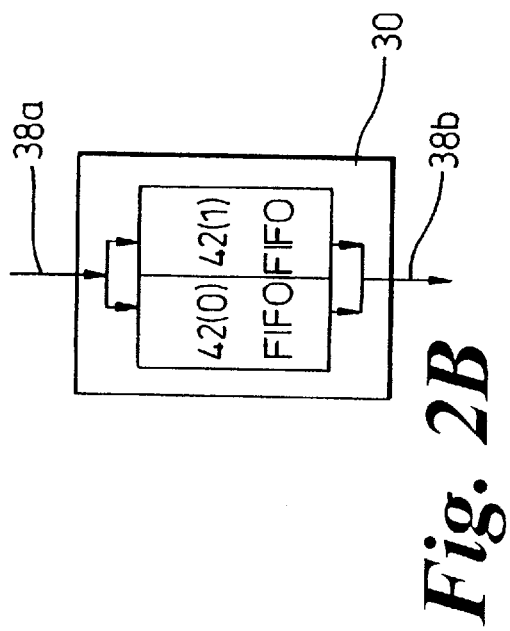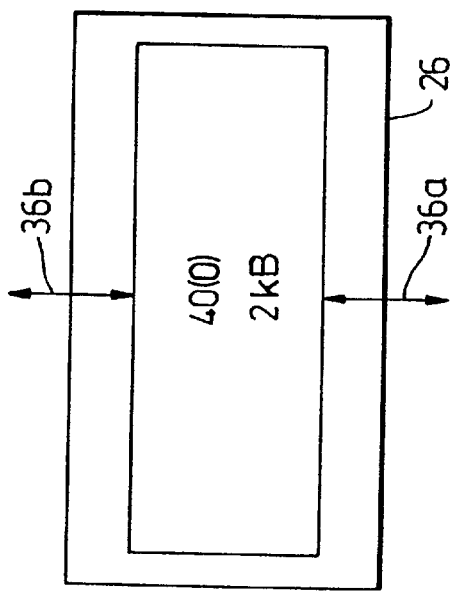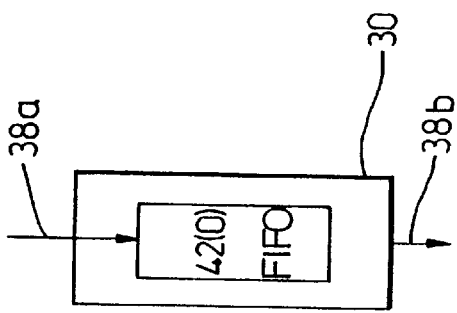
Fig. 2A
Fig. 2B

METHOD OF OPERATING A COMPUTER SYSTEM BY IDENTIFYING SOURCE CODE COMPUTATIONAL ELEMENTS IN MAIN MEMORY

The present application is a divisional of copending U.S. patent application Ser. No. 09/003,526, filed Jan. 6, 1998.

This invention relates to computer systems, and in particular, but not exclusively, to such systems for processing media data.

An optimal computer architecture is one which meets its performance requirements whilst achieving minimum cost. In a media-intensive appliance system, at present the main hardware cost contributor is memory. The memory must have enough capacity to hold the media data and provide enough access bandwidth in order that the computation throughput requirements can be met. Such an appliance system needs to maximise the data throughput, as opposed to a normal processor, which usually has to maximise the instruction throughput. The present invention is connected in particular, but not exclusively, with extracting high performance from low cost memory, given the restraints of processing media-intensive algorithms.

The present invention relates in particular to a computer system of the type comprising: a processing system for processing data; a memory (provided for example by dynamic RAM ("DRAM")) for storing data processed by, or to be processed by, the processing system; a memory access controller for controlling access to the memory; and a data buffer (provided for example by static RAM ("SRAM")) for buffering data to be written to or read from the memory.

At present, the cheapest form of symmetric read-write memory is DRAM. (By symmetric, it is meant that read and write accesses take identical times, unlike reads and writes with Flash memory.) DRAM is at present used extensively in personal computers as the main memory, with faster and more expensive technologies such as static SRAM being used for data buffers or caches closer to the processor. In a low cost system, there is a need to use the lowest cost memory that permits the performance (and power) goals to be met. In the making of the present invention, an analysis has been performed of the cheapest DRAM technologies in order to understand the maximum data bandwidths which could be obtained, and it is clear that existing systems are not utilising the available bandwidth. The present invention is concerned with increasing the use of the available bandwidth and therefore increasing the overall efficiency of the memory in such a computer system and in similar systems.

A typical processor can access SRAM cache in 10 ns. However, an access to main DRAM memory may take 200 ns in an embedded system, where memory cost needs to be minimized, which is a twentyfold increase. Thus, in order to ensure high throughput, it is necessary to place as much data in the local cache memory block before it is needed. Then, the processor only sees the latency of access to the fast, local cache memory, rather than the longer delay to main memory.

"Latency" is the time taken to fetch a datum from memory. It is of paramount concern in systems which are "compute-bound", i.e. where the performance of the system is dictated by the processor. The large factor between local and main memory speed may cause the processing to be determined by the performance of the memory system. This case is "bandwidth-bound" and is ultimately limited by the bandwidth of the memory system. If the processor goes fast enough compared to the memory, it may generate requests at a faster rate than the memory can satisfy. Many systems today are crossing from being compute-bound to being bandwidth-bound.

Using faster memory is one technique for alleviating the performance problem. However, this adds cost. An alternative approach is to recognise that existing memory chips are used inefficiently and to evolve new methods to access this memory more efficiently.

A feature of conventional DRAM construction is that it enables access in "bursts". A DRAM comprises an array of memory locations in a square matrix. To access an element in the array, a row must be first selected (or 'opened'), followed by selection of the appropriate column. However, once a row has been selected, successive accesses to columns in that row may be performed by just providing the column address. The concept of opening a row and performing a sequence of accesses local to that row is called a "burst".

The term "burst efficiency" used in this specification is a measure of the ratio of (a) the minimum access time to the DRAM to (b) the average access time to the DRAM. A DRAM access involves one long access and (n−1) shorter accesses in order to burst n data items. Thus, the longer the burst, the more reduced the average access time (and so, the higher the bandwidth). Typically, a cache-based system (for reasons of cache architecture and bus width) will use bursts of four accesses. This relates to about 25 to 40% burst efficiency. For a burst length of 16 to 32 accesses, the efficiency is about 80%, i.e. about double.

The term "saturation efficiency" used in this specification is a measure of how frequently there is traffic on the DRAM bus. In a processor-bound system, the bus will idle until there is a cache miss and then there will be a 4-access burst to fetch a new cache line. In this case, latency is very important. Thus, there is low saturation efficiency because the bus is being used rarely. In a test on one embedded system, a saturation efficiency of 20% was measured. Thus, there is an opportunity of obtaining up to a fivefold increase in performance from the bus.

Combining the possible increases in burst efficiency and saturation efficiency, it may be possible to obtain about a tenfold improvement in throughput for the same memory currently used.

A first aspect of the present invention is characterized by: means for issuing burst instructions to the memory access controller, the memory access controller being responsive to such a burst instruction to transfer a plurality of data words between the memory and the data buffer in a single memory transaction; and means for queueing such burst instructions so that such a burst instruction can be made available for execution by the memory access controller immediately after a preceding burst instruction has been executed.

A second aspect of the invention is characterised by: means for issuing burst instructions to the memory access controller, each such burst instruction including or being associated with a parameter defining a spacing between locations in the memory to be accessed in response to that burst instruction, and the memory access controller being responsive to such a burst instruction to transfer a plurality of data elements between the memory, at locations spaced in accordance with the spacing parameter, and the data buffer in a single memory transaction.

The third aspect of the invention provides a method of operating a computer system as indicated above, comprising: identifying in source code computational elements suitable for compilation to, and execution with assistance of, the at least one data buffer; transforming the identified computational elements in the source code to a series of operations each involving a memory transaction no larger than the size of the at least one data buffer, and expressing such operations as burst instructions; and executing the source code by the processing system, wherein the identified computational elements are processed by the processing system through accesses to the at least one data buffer.

Other preferred features of the invention are defined in the appended claims.

The present invention is particularly, but not exclusively, applicable only for certain classes of algorithm, which will be termed "media-intensive" algorithms. By this, it is meant an algorithm employing a regular program loop which accesses long arrays without any data dependent addressing. These algorithms exhibit high spatial locally and regularity, but low temporal locality. The high spatial locality and regularity arises because, if array item n is used, then it is highly likely that array item n+s will be used, where s is a constant stride between data elements in the array. The low temporal locality is due to the fact that an array item n is typically accessed only once.

Ordinary caches are predominantly designed to exploit high temporal locality by keeping data that is being used often close to the processor. Spatial locality is exploited, but only in a very limited way by the line fetch mechanism. This is normally unit stride and relatively short. These two reasons mean that caches are not very good at handling media-data streams. In operation, redundant data often replaces useful data in the cache and the DRAM bandwidth is not maximised. It is believed that traditional caches are ideally suited to certain data types, but not media data.

The main difference between the burst buffering of the invention and traditional caches is the fill policy, i.e. when (the first aspect of the invention) and how (the second aspect of the invention) to fill/empty the contents of the buffer.

In accordance with the invention, therefore, new memory interface structures (i.e. burst buffers) are proposed which may augment (i.e. sit alongside) a traditional data cache and may be used for accessing, in particular but not exclusively, media data. The use of DRAM or the like can then be optimised by exploiting the medial data characteristics, and the data cache can operate more effectively on other data types, typically used for control. It also appears that the data cache size may be reduced, as the media is less likely to cause conflicts with the data in the cache, without sacrificing performance. Possibly it may prove to be the case that the total additional memory required for the burst buffers is of the same magnitude as the savings in memory required for the data cache.

A system may contain several burst buffers. Typically, each burst buffer is allocated to a respective data stream. Since algorithms have a varying number of data streams, it is proposed to have a fixed amount of SRAM available to the burst buffers. This amount may be divided up into equal sized amounts according to the number of buffers required. For example, if the amount of fixed SRAM is 2 kByte, and if an algorithm has four data streams, the memory region might be partitioned into four 512 Byte burst buffers. Another algorithm with six streams could be supported by dividing the memory into eight burst buffers each of 256 Bytes in size. In other words, where the number of data streams is not a power of two, the number of burst buffers is preferably the nearest higher power of two.

In architectures according to the invention a burst comprises the set of addresses defined by:

$$\text{burst}=\{B+S\times i | B, S, i \in N^{\circ} 0 \leq i < L\}$$

where B is the base address of the transfer, S is the stride between elements, L is the length and N is the set of natural numbers. Although not explicitly defined in this equation, the burst order is defined by i incrementing from 0 to L−1. Thus, a burst may be defined by the 3-tuple of:

(base_address, length, stride)

In software, a burst may also be defined by the element size. This implies that a burst maybe sized in bytes, half-words or words. The units of stride must take this into account. A "sized-burst" is defined by a 4-tuple of the form:

(base_address, length, stride, size)

A "channel-burst" is a sized-burst where the size is the width of the channel to memory. The compiler is responsible for the mapping of software sized-bursts into channel-bursts. The channel-burst may be defined by the 4-tuple:

(base_address, length, stride, width)

If the channel width is 32 bits (or 4 bytes), the channel-burst is always of the form:

(base_address, length, stride, 4)

or abbreviated to the 3-tuple (base_address, length, stride).

The control of this memory and the allocation (and freeing) of burst buffers may be handled at a higher level by either a software or hardware process. This process may include other architectural features such as the automatic renaming of burst buffers.

Figure 3:
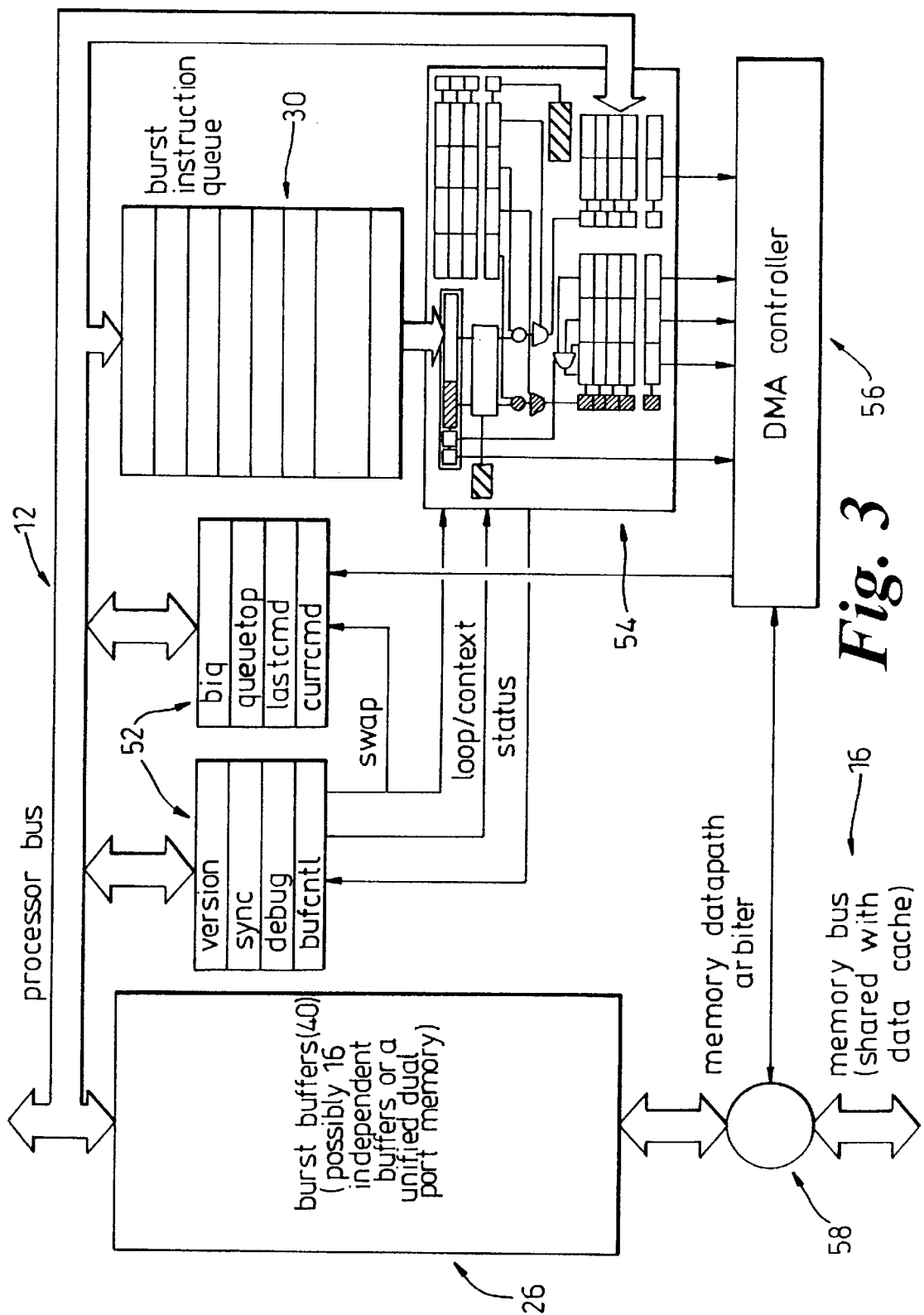
Figure 4:
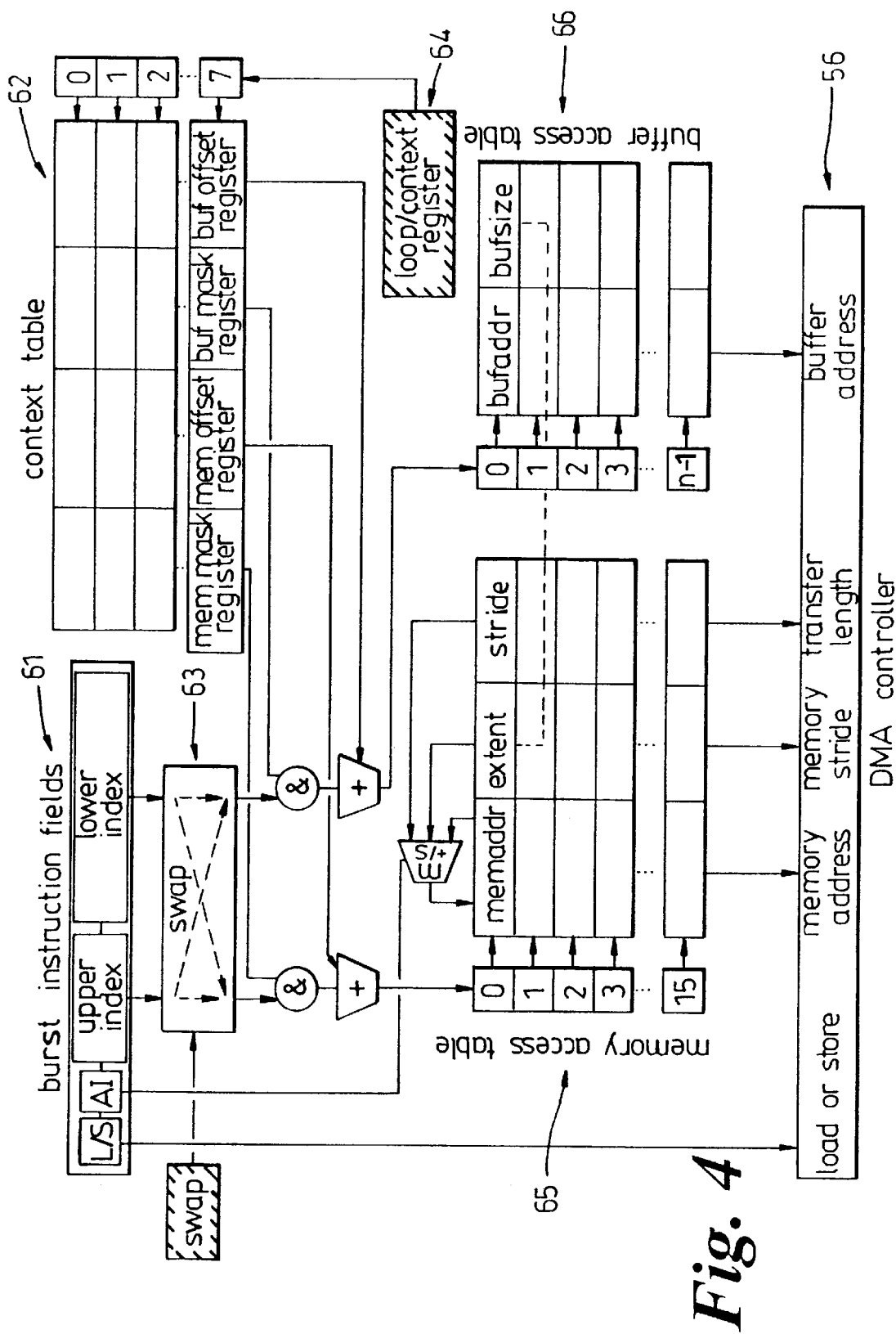
Figure 5:
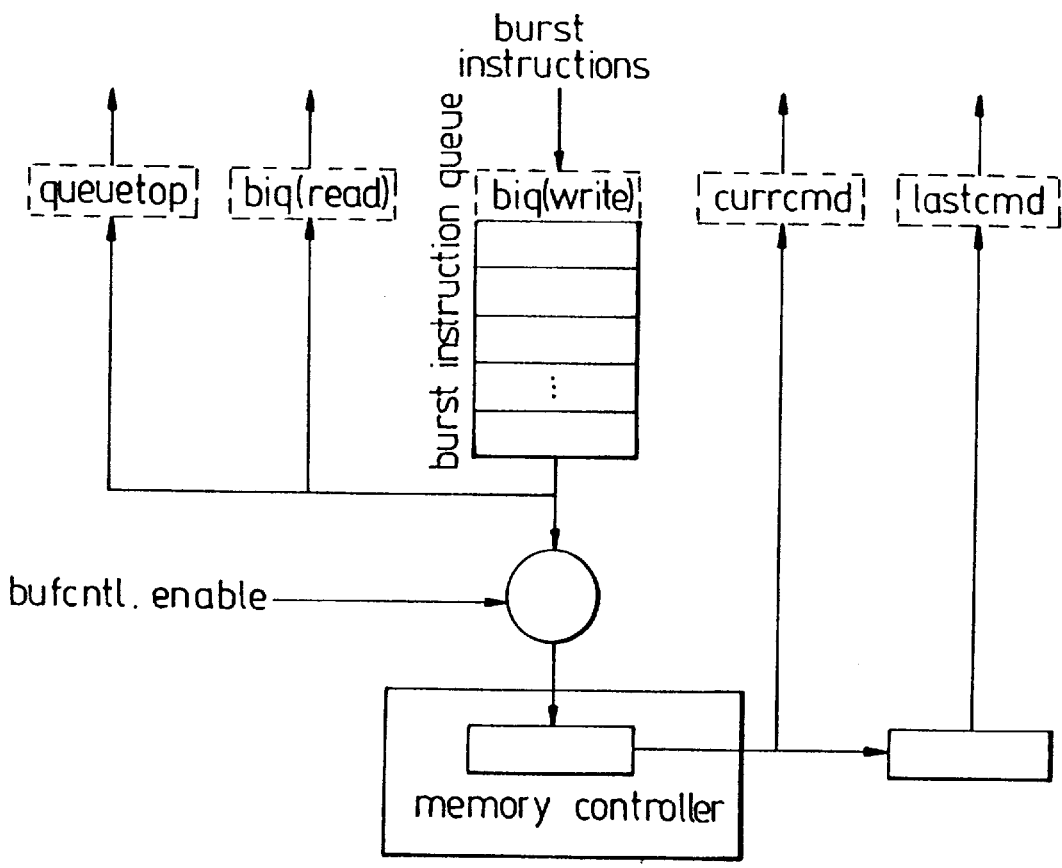
Figure 6:
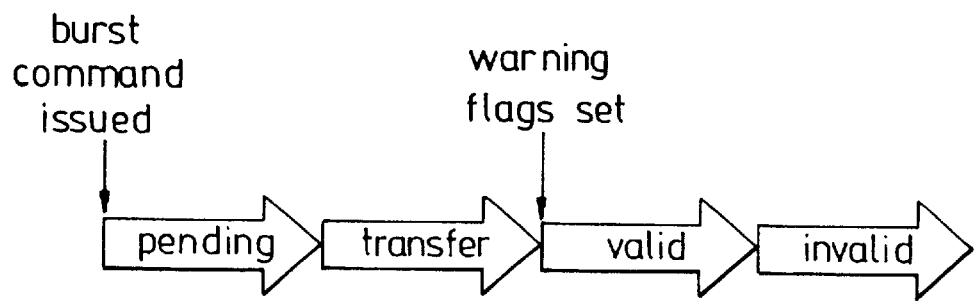
Figure 7:
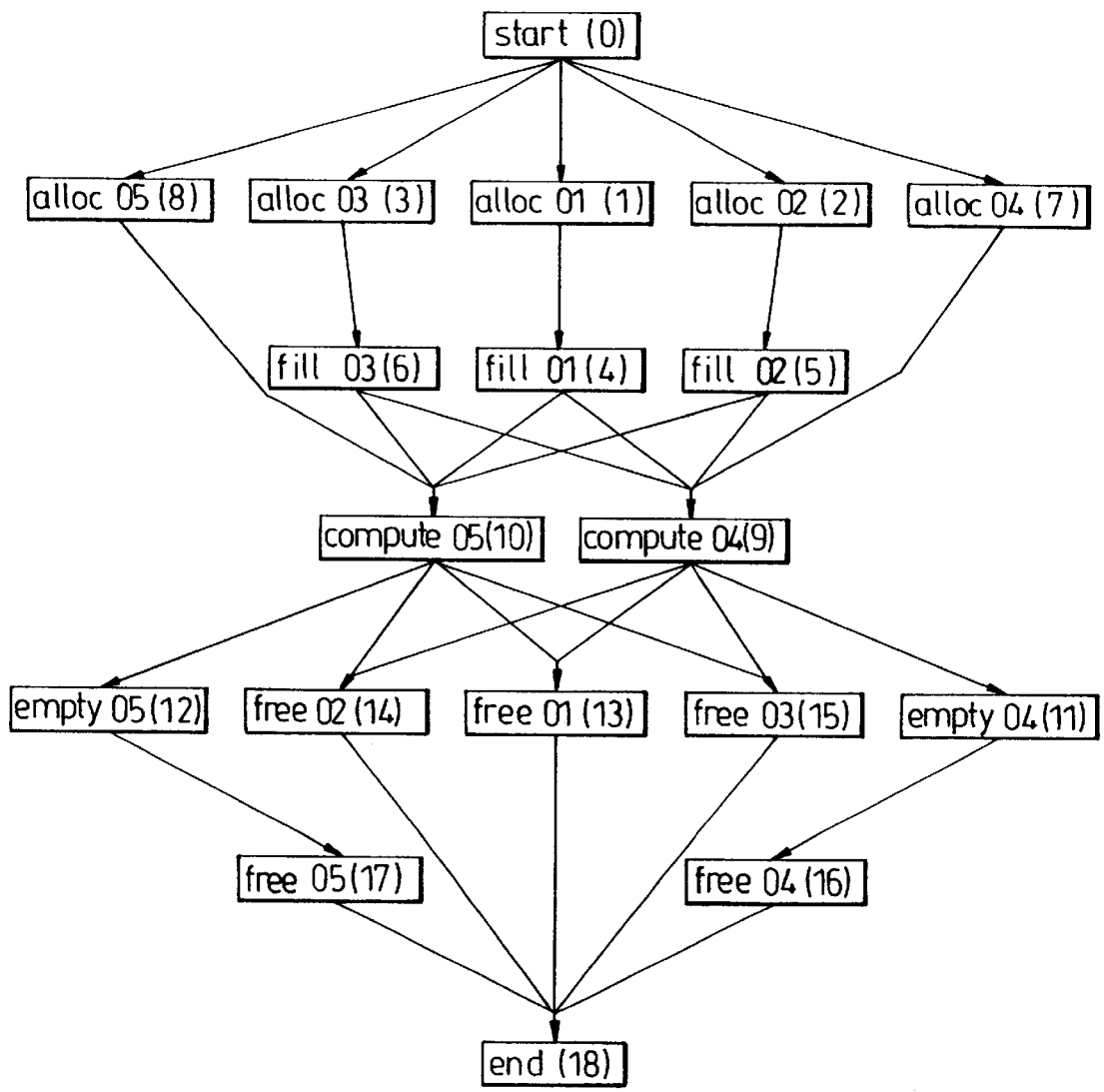

A specific embodiment of the invention will now be described by way of non-limiting example with reference to the accompanying drawings, in which:

FIG. 1: is a block diagram of a first embodiment of a computer system in accordance with the present invention;

FIGS. 2A to 2D: show four ways in which a burst buffer memory and burst instruction queue in the system of FIG. 1 may be configured under hardware or software control;

FIG. 3: is a schematic diagram of a burst buffer architecture in a second embodiment of a computer system in accordance with the present invention;

FIG. 4: is a schematic diagram of the buffer controller of FIG. 3;

FIG. 5: is a schematic diagram illustrating the function of control registers in the burst buffer architecture of FIG. 3;

FIG. 6: is a diagram illustrating the different steps in the execution of a burst instruction by the burst buffer architecture of FIG. 3; and FIG. 7: is a dependency graph associated with source code transformed for compilation to a computer system according to the invention.

Referring to FIG. 1, the computer system comprises, as is known: a processor 10, such as an i960; main DRAM memory 14, such as EDO DRAM, with a main memory interface or access controller 16; a small SRAM instruction cache 18 with a path 20a from the memory interface 16 and a path 20b to the processor 10; an SRAM data cache 19 with a path 21a between the data cache 19 and the memory interface 16 and a path 21b between the data cache 19 and the processor 10; and a path 22 between the processor 10 and memory interfaces 16 for cache bypass processor loads and stores. Unlike a known computer system, a burst buffer system 24 is also provided, as enclosed by a dashed line in the drawing.

The burst buffer system 24 includes: (1) a processor interface 12, for example a co-processor for the processor 10; (2) a burst buffer memory 26 provided by a fixed amount of SRAM, for example 2 kBytes; (3) a range comparator 28 which can accept memory requests from the processor 10 and transparently (to the processor 10) determine whether the required data is resident in the burst buffer memory 26 or whether to initiate an access to the main memory 14 to fetch the data; (4) a burst instruction queue 30 in the form of at least one FIFO, which can receive burst instructions from the processor 10; (5) a burst controller 32 which is operable to evaluate the current system status, extract the next relevant burst instruction from the burst instruction queue 30 and issue that instruction or request to the main memory 14; (6) a parameter store 34 which holds parameters relating to burst transfers and which may be updated by some specific burst instructions; (7) data paths 36a to 36d for the movement of data between burst buffer memory 26 and the processor and memory interfaces 12, 16, and including a data path 36d bypassing the burst buffer memory 26 for missed data; and (8) control paths 38a to 38f for the movement of status information and burst instructions within the burst buffer system 24 and to the processor and memory interfaces 12, 16.

Figure 2D:
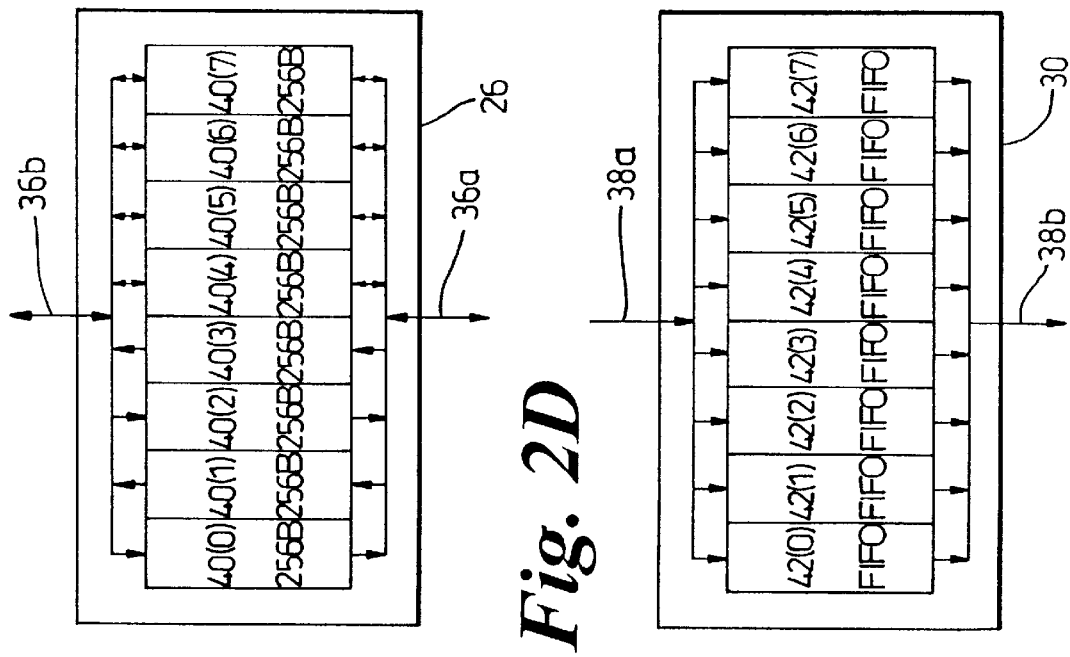
Figure 2C:
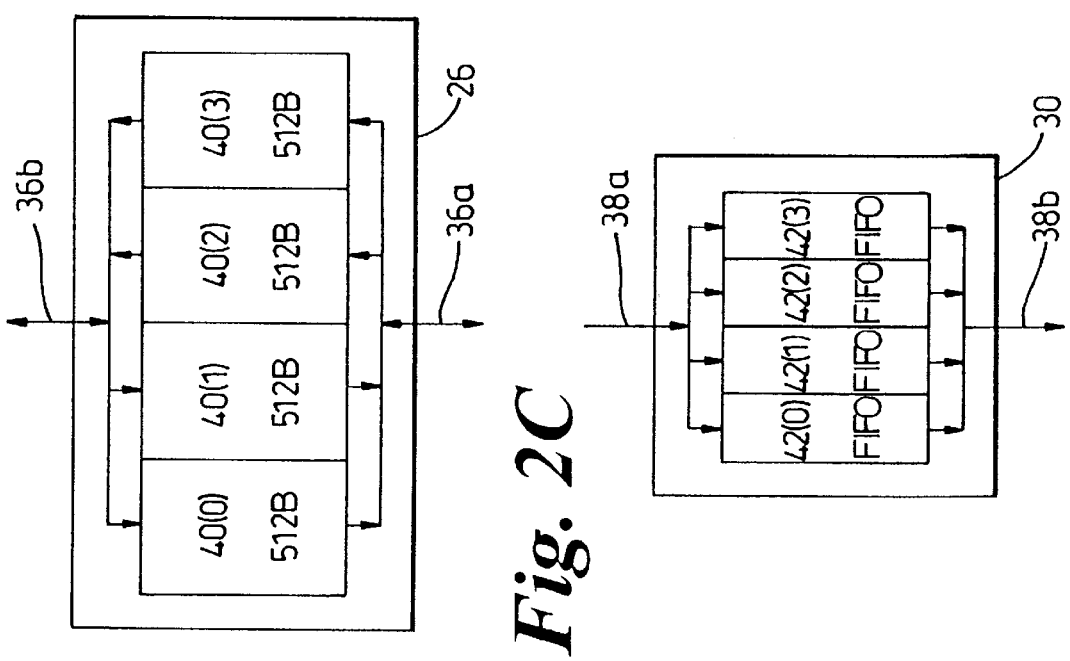

As shown in FIGS. 2A to 2D, the burst buffer memory 26 is configurable as a selectable number of buffers 40: for example as a single 2 kByte buffer 40(0), as shown in FIG. 2A; as a pair of 1 kByte buffers 40(0), 40(1), as shown in FIG. 2B; as four 512 Byte buffers 40(0) to 40(3), as shown in FIG. 2C; and as eight 256 Byte buffers 40(0) to 40(7), as shown in FIG. 2D. Also, each buffer may be arranged as an input buffer from the main memory 14 to the processor 10 (for example as for buffers 40(2), 40(3) in FIG. 2C), as an output buffer from the processor 10 to the main memory 14 (for example, as for buffers 40(0), 40(1) in FIG. 2C), or as a directional buffer (for example as for buffer 40(0) in FIG. 2A). The burst instruction queue 30 is configured so as to have the same number of FIFOs 42 as the number of burst buffers 40, one for each burst buffer 40. The configuration of FIG. 2A would be used when there is one data stream, of FIG. 2B when there are two datastreams, of FIG. 2C when there are three or four data streams, and of FIG. 2D when there are between five and eight data streams. In an alternative arrangement, a single burst instruction queue FIFO 42 may be used whatever the number of burst buffers 40.

The processor 10 can operate on normal i960 instructions such as the load instruction "ld", which, with its parameters, takes the form:

ld(g5),r4

This instructs the processor to fetch the data word pointed to by the address in its register g5 and to place that data word in its register r4. However, in one embodiment of the invention, the instruction set is extended to include an equivalent "loadburst" instruction, which, with its parameters, takes the form:

loadburst src,stride,size,buf

This causes a burst of size data words to be transferred from the memory 14 to that one of the input or bidirectional burst buffers 40(buf) having the identity buf, beginning at address src in the memory 14, and with addresses incrementing by stride memory locations. There is also corresponding "storeburst" instruction, which, with its parameters, takes the form:

storeburst buf,src,stride,size

This causes a burst of size data words to be transferred from that one of the output or bidirectional burst buffers 40(buf) having the identity buf to the memory 14, beginning at address src in the memory 14, and with addresses incrementing by stride memory locations.

The instructions loadburst and storeburst differ from normal load and store instructions in that they complete in a single cycle, even though the transfer has not occurred. In essence, the loadburst and storeburst instructions tell the memory interface 16 to perform the burst, but they do not wait for the burst to complete.

In the above system, the memory interface 16 must, within reason, be able to service burst requests with any size and stride. There must also be a high degree of coupling to the microprocessor 10, with the best solution being combined integration on the same chip. Memory requests from the processor 10 may be performed in several manners, two being: (a) using a memory-mapped register for the burst instruction queue 30; and (b) using a coprocessor interface to bypass the load/store mechanisms. The latter of these is preferred, but requires architectural features not always present in a processor. Using the latter model also requires the definition and use of new processor instructions.

One of the main advantages of a cache is that of transparent correctness. The correct data is always given to the processor and updated in main memory whenever appropriate, using hardware methods invisible to the processor. The burst buffer system 24 also provides similar functionality.

In the above system, the data in a burst buffer 40 is copied from a region of main memory 14. The location information (i.e., address, stride etc.) is compared against any memory request from the processor 10 to determine if it hits the respective buffer 40. The comparison can be performed in a couple of ways: all addresses in the buffer 40 could be held and associatively compared by the range comparator 28 with processor address (as for normal cache tags); and an equation specifying the addresses in the buffer can be examined by the range comparator 28 using the processor address to see if it is a solution. The former is expensive (and gets even more expensive for higher speed) whereas the latter is cheap and fast, but restricts the stride to powers of two to obtain satisfactory performance.

A read hits in a buffer 40 if the address range comparison is true. In this case the datum is returned very quickly to the processor from the buffer. On the other hand, a read miss causes the required datum to be extracted from main memory 14 directly, bypassing the burst buffer memory 26. However, if the datum is in a range that is currently being loaded, the read is "stalled" or "blocked" until the range is loaded and then it is extracted from the buffer 40 and passed to the processor 10. (In a modification, the datum would be passed on as soon as it was received to save latency.) If the datum were in a burst that is due to be issued, then the read may again be blocked until the burst is performed in order to prevent the datum being read twice in close succession.

A write hit causes the datum in the respective buffer 40 to be updated. The main memory 14 is not updated at that time, but coherency with the main memory 14 is achieved under software control by performing a storeburst sometime later. On the other hand, a write miss causes the datum to be updated in the main memory 14 directly unless a storeburst is pending or active containing the same datum. In this case the write is blocked until after the storeburst has completed.

The burst controller 32 for issuing instructions to the memory interface 16 may use a mechanism which will be termed "deferral". This means that the time at which the instruction is issued is deferred until some later time or event. For example, if the next instruction were a storeburst-deferred-16access, it would wait until 16 accesses into the burst buffer had been completed, and then automatically issue the store. Other deferral mechanisms may be based on: time (i.e. count cycles); events such as external interrupts; and buffer full/empty indicators. Using deferral on access count is a powerful feature of the burst buffer system 24 because it allows decoupling of the program flow and the issuance of instructions to the memory interface 16.

The burst buffer controller 32 provides status information back to the processor 10 on path 38*f*. It also provides a unique buffer identifier so that software-controlled buffer allocation and logical buffer renaming may be implemented.

If the length of a burst is longer than the size of the respective buffer 40, one procedure is to truncate the burst length so that it is the same as that of the buffer 40. However, in a modified procedure, a much longer stream is brought in through the buffer in bursts. A single instruction, such as a loadstream-deferred-32access, could be used to bring in a much longer stream in chunks the size of the burst buffer, with each chunk being replaced by the next one after the specified number of accesses have been made.

An access mode which is not transparent to the processor 10 may also be supported. It is easiest to describe this as a first-in-first-out (FIFO) buffer. In this case, the processor 10 accesses the buffer 40 using a single address, which, on reads, "pops" the first element from the burst buffer 40. Subsequent reads work down through the whole buffer. Notions of full and empty now come into play. A more generic extension of this is to provide a "window" on to the buffer 40. This window effectively allows relative access to the buffer. After a fixed number of accesses in this window (or on some other trigger), the window is advanced such that its position is centralised over another datum. The amount of advancement may be programmed. This may be termed a "rotating window" method and many implementations are possible.

There now follows a description in greater detail of the operation of the burst buffer system 24.

The data in the buffer 40 is checked to be valid by comparing the requested address with the result from calculations using start address, length, and stride information. There are no restrictions on length and stride values (apart from register size). However, for normal loadburst and storeburst instructions, if the length is greater than the buffer size, it will be truncated. The value read back from the register will be the truncated value. The range comparison may be quite slow unless address tags are also used. Range checking only considers the word address so that bits 0 and 1 are ignored.

A read hit in the buffer 40 causes the data item to be recovered. A miss causes a fetch from the main memory 14.

A write hit causes the appropriate buffer 40 to be updated. A write miss updates the main memory 14 directly. Coherency is maintained by finally writing the complete buffer 40 back to the main memory 14.

All data that may use a buffer 40 may be marked as "non-cacheable" to prevent coherency issues which would result if that data were also in a data cache. This means that the data cache must be restricted from the line fetches in the same region of memory that contains data for the buffers 40.

Associated with each buffer 40 is a status register which may be read. This contains a valid bit which indicates whether the buffer is in use or not. The software may examine these flags to determine which buffers are available. Other status information including current operation status is also available.

Accesses to invalid buffers will simply cause normal memory loads and stores to be generated. The validity mechanism is transparent to software.

A loadburst instruction written to the queue 30 causes the target buffer to be filled with a burst of the specified characteristics. On issuing the loadburst instruction, the buffer is completely invalidated until the the fill operation has completed. Any data held in the buffer is irretrievably lost.

A storeburst instruction will cause the target buffer to be emptied with a burst of the specified characteristics. On issuing the storeburst instruction, the buffer is locked (i.e. all access is prevented) and is copied to memory. The buffer is then invalidated.

Both loadburst and storeburst instructions may be deferred. This means that a count is associated with each instruction which describes the number of reads and writes that must be performed in order to trigger the operation. (Other options include clock ticks and instruction counts.) This means that a storeburst deferred by 16 accesses could be issued to a buffer. The buffer controller would then wait for 16 accesses to the buffer, at which point the buffer is emptied.

A buffer may be made valid by an "allocbuffer" instruction. This instruction is similar to the loadburst instruction in that it provides address information to the range calculator, but does not cause a load of any data. This permits a buffer to be filled using processor writes rather than needing a previous loadburst. The allocbuffer instruction results in the buffer being made valid. The data contained in the buffer remains unchanged this means buffers full of data may be remapped over a different memory region.

There is an equivalent "freebuffer" instruction. This simply invalidates the buffer leaving its contents unchanged. A subsequent allocbuffer instruction could restore the buffer to its previous state.

The processor will stall under several conditions: (1) the buffer instruction queue is full and a burst instruction is issued; (2) a burst instruction is in progress and an access to the target buffer is required; (3) a burst instruction misses in the buffer and a normal memory access must be performed.

If the length specified for a transfer is less than the length of the buffer, then a partial access is performed and the unused locations in the buffer are undefined.

Burst transfers are restricted in that they always empty in the order implied by the burst instruction. Partial accesses always begin at the first position in the buffer.

Since strides are a signed quantity, the order of the burst data will always be sequential, but either ascending or descending.

The number of buffers required by a particular application or system will vary depending on the performance needs, number of streams that need to be supported, etc.

Instructions are only executed on completion of the previous one.

A "storeburst value 0" command can be issued which causes the target memory region to be filled with zeros. The burst buffer itself is not zeroed, but a separate datapath writes the value 0 to the main memory. In an extension to this, any value may be allowed to be specified, and a register is provided which is set to the required value.

A "loadburst value 0" instruction causes the buffer to be filled with zeros (i.e., cleared). Although no memory traffic is generated, this operation is performed in the same manner and will take longer than a cycle. As such it should be handled just like any other loadburst instruction.

Provided the application can guarantee that a data stream meets the following conditions, it may be brought into memory automatically with the memory controller decomposing the stream into bursts. The conditions are: (1) each data element is brought in sequentially; (2) each data element is used either exactly once or in accordance with a predetermined usage pattern; (3) processing the stream in chunks of the buffer size is accommodated. If these conditions are met, a write stream or a read stream may be broken down into burst instructions deferred by the appropriate number of accesses. Whereas the length associated with a burst transfer is normally truncated to the buffer size, using the loadburst stream and storeburst stream instructions interprets the length as the stream length. These instructions may also be initially deferred, but this only affects the start of the first burst transfer. Subsequent bursts are automatically deferred by the size of the buffer.

A "burstabort" command may be used to abort a burst transfer. Its functionality is restricted in that it cannot terminate a burst in progress. However, if the burst is pending (i.e. deferred) it will be cancelled. In any case, the buffer is always made invalid. Its real use is for terminating a stream access in which case the stream is terminated at the end of the current burst or immediately if the burst is pending.

Considering now the firmware interface of the system, associated with each burst buffer 40 are four registers. These registers are memory-mapped and may be accessed by the processor with single-cycle loads and stores. The register names are: 1. base_address; 2. length; 3. stride; and 4. control/status. The former three registers contain the parameters used for burst instructions. The burst instructions are written to the control register and status information may be obtained by reading the control register. All registers are one word wide (i.e. 32 bits for this implementation). Each register will be described in turn below. In order to understand the relevance of the registers, it is necessary to define the function used to fetch data in a burst. Each element, i, in a burst transfer is fetched from an address in the main memory given by the following equation:

$$\text{Addresses}[i] = \text{base\_address} + (i-1)*\text{stride} \qquad \text{(Equation 1)}$$

where i ranges from 1 to length.

Regarding the base_address register, before any burst instruction is issued, the base_address register must be initialed. When a burst instruction is issued, the base address is used to calculate the data addresses. The base address is never automatically changed, even for stream accesses.

Writes to the base_address register when a buffer is valid will make that buffer invalid. The register itself is shadowed by hardware to ensure that any active bursts are completed correctly, even though they are subsequently invalidated.

The base address is specified in bytes and must be word aligned. If it is not, the value is automatically truncated and no rounding is performed. The value read from the register is unaltered.

Regarding the length register, before any burst instruction is issued, the length register must be initialised. When a burst instruction is used, the length is used to calculate the data addresses. For non-stream bursts, the length register is restricted to lengths that are less than or equal to the burst buffer length. If a burst instruction is used and the value of the length register exceeds this criterion, it is automatically truncated to the buffer length. This truncation occurs as the burst instruction is issued, not when the write to the length register occurs. The truncated value will be the value subsequently read from this register.

For stream accesses, the length register specifies the length of the total stream transfer.

Writes to the length register when a buffer is valid will make that buffer invalid. The register itself is shadowed by hardware to ensure that any active bursts are completed correctly, even though they are subsequently invalidated.

The transfer length is measured in bytes, but is restricted to being a multiple of words (i.e. 4 bytes). Values that are not aligned to word boundaries will be truncated and no rounding is performed. The value read from the register is unaltered.

Regarding the stride register, before any burst instruction is issued, the stride register must be initialised. When a burst instruction is issued, the stride is used to calculate the data addresses. The stride is never automatically changed, even for stream accesses.

Writes to the stride register when a buffer is valid will make that buffer invalid. The register itself is shadowed by hardware to ensure that any active bursts are completed correctly, even though they are subsequently invalidated.

The stride is measured in bytes, but is restricted to being a multiple of words (i.e. 4 bytes). Values that are not aligned to word boundaries will be truncated and no rounding is performed. The value read from the register is unaltered.

Regarding the control/status register, all burst instructions are aliases of writes to the control register. The data used in these accesses is organised according to the formats defined for each instruction. The first 3 bits of the word are used to identify the instruction.

A description will now be made of the various burst instructions. First, an "allocbuffer" instruction is used to configure a buffer to map an area of memory. No burst is performed, but the buffer is made valid and range checking is performed. The length of the transfer must be less than or equal to the size of the buffer. Values greater than this will automatically be truncated to the buffer size. Range checking will compare against the set of addresses generated according to Equation 1 above. The format of the data word used to issue this instruction is:

allocbuffer: [000] [29 reserved bits]

Because the data in a buffer remains in a buffer through invalidation, a buffer may be "remapped" by changing the buffer parameters and issuing a second allocbuffer instruction.

A "burstabort" instruction is used to abort burst instructions. A burst from memory into a buffer cannot be aborted once it is in progress. However, a deferred burst may be aborted whilst pending, and a loadstream command may be aborted on a burst boundary. In all cases, the buffer is made invalid. Any data in the buffer is left unchanged. The format for this instruction is:

burstabort: [001][29 reserved bits]

A "freebuffer" instruction is used to invalidate the associated buffer. No parameters are used. The format is:

freebuffer: [010][29 unused bits]

"Loadburst" and "storeburst" instructions are used to fetch a burst of data into the burst buffer and to write a burst of data into main memory, respectively. The length of the transfer must be less than or equal to the size of the buffer. Values greater than this will automatically be truncated to the buffer size. The burst addresses are generated according to the Equation 1 above. The formats of the data words used to issue these instructions are:

loadburst: [011][V][12 reserved bits][16 bit deferral_count]

storeburst: [100][V][12 reserved bits][16 bit deferral-count]

where V is a value bit and indicates whether the data loaded into the buffer is all zeros (V=1) or real data from memory (V=0). The bottom 16 bits are the deferral count. If this value is greater than 0, the burst operation is deferred until deferral_count accesses have been made to the buffer. These accesses are either reads or writes. Transfers always are always word-aligned, both in start address, length, and stride.

"Loadstream" and "storestream" commands are used to bring a complete data stream into the buffer and to copy a complete data stream from the buffer, respectively. The length of the stream is defined in the length register and limited to $2^{32}$ bytes. The buffer manager automatically decomposes the stream into a set of bursts that are transferred from memory to the buffer and to memory from the buffer, respectively. The filling of the buffer is automatically co-ordinated by hardware. Burst boundaries are detected using the deferral count. This means that a buffer is replaced by the next buffer in the sequence after a predefined number of accesses. No other mechanism for progressing through the stream is available, but it is possible to consider mechanisms that advance the stream using another instruction. For a stream of length L bytes, there are L/4S bursts of length S over a memory bus having a width of four bytes, plus a burst to bring in the remainder and to copy out the remainder, respectively. The length must be a multiple of 4 bytes or is truncated down to the nearest multiple. A loadstream value 0 will continually load zeros into the buffer and will not cause any real memory accesses. A storestream value 0 will continually load zeros into memory. The format for these instructions are:

loadstream: [101][V][12 reserved bits][16 bit deferral_count]

storestream: [110][V][12 reserved bits][16 bit deferral_count]

where V is as defined above. The bottom 16 bits are the deferral count.

A "querystatus" command is used to evaluate the condition of the associated burst buffer. It is the only read command supported for the buffers. The value returned is 0 if the buffer is not allocated and 1 if it is. Information regarding the current mapping may be obtained by reading the other registers. No other information is available.

A second embodiment of a computer system in accordance with the present invention is shown in FIGS. 3 and 4. In this embodiment, the cache-like interface of the first embodiment is replaced by an interface based around a pair of tables: a Memory Access Table (MAT) describing regions of main memory for bursting to and from the burst buffer memory, and a Buffer Access Table (BAT) describing regions of burst buffer memory. In this embodiment, a homogeneous area of dual-port SRAM is used for the burst buffers.

The main features of the architecture of the second embodiment are shown in FIG. 3. Where features are essentially similar to those of the first embodiment, the same reference numbers have been used. Burst instructions are provided from the processor interface 12 by means of a burst instruction queue 30. Instructions from the burst instruction queue 30 are processed by a buffer controller 54 to reference slots in the MAT 65 and the BAT 66. The buffer controller also receives control inputs from eight burst control registers 52. Information contained in these two tables is bound together at run time to describe a complete main-memory-to-burst-buffer transaction. Outputs are provided from the buffer controller 54 to direct memory access (DMA) controller 56 and hence to memory datapath arbiter 58 to effect transactions between the main memory 14 and the burst buffers memory 26.

In this embodiment, burst buffer memory 26 is provided as a 2KB dual-ported SRAM. One port of the SRAM sits in the processor memory space, and can be used for rapid processor access. For this architecture to be advantageous, it is only necessary for access from the burst buffer memory 26 to be significantly faster than access from the main memory 14: however, single cycle processor access to burst buffer memory 26 is particularly advantageous. The function of the other port is to permit direct memory access transfers between main memory and the SRAM as indicated above. Individual buffers within burst buffer memory 26 are held in buffer regions defined by the buffer address and its length. It is desirable for byte, halfword and word access (dynamic bus sizing) to be supported on the processor port: this is also desirable but less necessary on the DMA port. This dual porting allows bursts to and from main memory to be run concurrently with accesses from the processor. If there are no appropriate interlocks or priority mechanism, software needs to prevent write conflicts to the same SRAM location.

The SRAM needs to be sized so as to handle several streams in a computation, and to handle the demands associated with long bursts. It is found that for a large number of applications providing resources to handle eight streams is sufficient: as is discussed elsewhere, for each stream it is desirable to have two buffers: one for incoming and outgoing streams, and the other for streams undergoing computation. This suggests finding room for 16 bursts. It is also found that bursts of 32 will achieve about 80% of the available bandwidth using SDRAMs—with a 32 bit wide path to memory, this results in 128 bytes per burst buffer, and 2 Kbytes of SRAM in total to accommodate 16 such buffers.

The burst control registers 52 are described below.

The main buffer control register is bufcntl. This register provides centralised control of the burst buffer architecture. The functionality associated with each bit of this register is set out in Table 1 below.

TABLE 1

Buffer control register definitions

| bit | name | read/write | description | default |
|---|---|---|---|---|
| 0 | enable | read/write | enable burst instructions<br>0 = disable burst instruction DMA<br>1 = enable | 0 |
| 1 | swap | read/write | instruction format selector<br>0 = format A; 1 = format B | 0 |
| 2 | single | read/write | single step mode<br>0 = normal operation<br>1 = pause between burst instructions | 0 |
| 3 | intenable | read/write | enable interrupt in single step mode only<br>0 = disable<br>1 = enable | 0 |
| 7:4 | unused | | | 0x0 |
| 8 | transfer | read only | transfer in progress indicator<br>0 = no transfer in progress<br>1 = transfer in progress | 0 |
| 15:9 | unused | | | 0x00 |
| 23:16 | context | read/write | pointer to loop/context table | 0x00 |
| 31:24 | pending | read only | burst instruction queue depth (i.e. number of pending instructions) | 0 |

The version register is read-only, and its purpose is self-explanatory.

The sync register is a read-only register that is used to deliberately stall the processor until the burst instruction queue becomes empty. Reading this register is useful for synchronising between processor instructions and burst instructions executing concurrently. The practical use of the sync register is described further below. Reading this register returns one of four values as shown in table 3.4. This value refers to the last burst instruction executed before the sync instruction.

TABLE 2 sync register read values

| sync register read value | description |
|---|---|
| 0x0 | no stall was required - the read completed immediately |
| 0x1 | stall was required until a storeburst completed |
| 0x3 | stall was required until a loadburst completed |
| 0x5 | reserved for future use |

The default value is 0×0. Note that this implies that only bits 2:0 are used and that all other bits are always 0. (Bit 0 indicates whether a stall was required and bits 2:1 indicate the instruction, matching bits 31:30 of the instruction format, which is described below. Note that the sync instruction cannot stall the read of this register so it is not defined for use here.)

Capacity is also provided to allow a write to this register in exceptional circumstances: specifically, to permit an exception handler to restore the state of the sync register before returning.

The next four registers are used to track burst instruction progress from the burst instruction queue to the memory controller. FIG. 5 shows the structure and position of these registers.

The currcmd register holds the instruction that is currently being executed by the memory controller. It is a read-only register. It is only valid when bufcntl.transfer is 1. However, in its idle state, this register returns the null instruction, which means that reading a load or store burst instruction automatically implies that there is a burst in progress. lastcmd is a read/write register. In normal operation it is read-only since it conveys the last instruction executed by the memory controller. However, it has write capability since the register must be rewritten after returning from a context switch (discussed further below) in order that the state at the time of the context switch can be totally restored. Initially this register is set to the null command.

The queuetop register is used for emptying the burst instruction queue at a context switch. Having disabled burst instruction execution 0 to bufcntl.enable, the contents of the queue may be read, instruction by instruction until the queue is empty. Reading queuetop has the effect of removing the top instruction (i.e. not the instruction that is executing) from the queue. This register may be read at anytime and will always return the instruction it removed from the top of the queue. This instruction will not be executed.

The depth of the queue is held in bufcntl.pending. Reading the null instruction also implies that the queue is empty.

Burst instructions are written to the 'burst instruction queue' register biq. Instructions are effectively placed into the start of the queue. Reading the biq register, like reading the queuetop register, returns the instruction at the top of the burst instruction queue (i.e. the next instruction to be executed by the memory controller). However, in this case, that is all that reading the register does. In contrast to instructions which have been read from queuetop, an instruction which is read from biq will also be executed. Reading a null instruction implies that the queue is empty or that initialisation has just completed. Note that because the biq register is logically a queue, writes followed by reads are likely not to return to the same value, unless the queue was empty.

The final register is debug. Debugging is not discussed in detail here, but the register definitions are provided in Table 3 below.

TABLE 3 debug register definitions

| bit | name | read/write | description | default |
|---|---|---|---|---|
| 0 | step | read/write | single step next instruction from burst instruction queue writes: 0 = do nothing; 1 = step reads: 0 = idling (instruction complete); 1 = step in progress | 0 |
| 15:1 | unused | | | 0x0000 |
| 16 | buffer_overrun_warn | read/write | buffer area overrun warning | 0 |
| 17 | stride_overrun_warn | read/write | stride value warning | 0 |
| 18 | memtab_modified_warn | read/write | memory access table entry modified after burst instruction issue warning | 0 |
| 19 | buftab_modified_warn | read/write | buffer access table entry modified after burst instruction issue warning | 0 |
| 20 | invalid_instruction_warn | read/write | invalid instruction detected and ignored by memory controller warning | 0 |
| 31:21 | unused | | | 0x000 |

The burst instruction queue 30 comprises as before a FIFO memory. Burst instructions are provided by the processor: compilation of source code to this structure is described further below. In this embodiment, four fields are provided in the burst instruction. These are:

1. Instruction
2. Auto-stride indicator for MAT (block_increment bit)
3. Index to entry in MAT used to control transfer
4. Index to entry in BAT used to control transfer The fundamental operation is to tissue an instruction which indexes to two table entries, one in each of the memory access and buffer access tables. The index to the memory access table retrieves the base address, extent and stride used at the memory end of the transfer. The index to the buffer access table retrieves the base address within the burst buffer memory region. It should be noted that the indices provided in the burst instruction are not in themselves address values in the embodiment described (though they may be in alternative embodiments. In the present embodiment, masking and offsets are provided to the index values by a context table, as will be discussed further below. The direct memory access (DMA) controller is passed the parameters from the two tables and uses them to specify the required transfer.

Two alternative formats are provided, as is indicated in Table 4 below:

TABLE 4

Instruction format options

| Field | Format A bufcntl.swap = 0 | Format B bufcntl.swap = 1 |
|---|---|---|
| instruction | bit 31:30 | bit 31:30 |
| block_increment indicator | bit 29 | bit 29 |

TABLE 4-continued

Instruction format options

| Field | Format A bufcntl.swap = 0 | Format B bufcntl.swap = 1 |
|---|---|---|
| memory access table index | bits 28:22 (upper field) | bits 21:0 (lower field) |
| buffer access table index | bits 21:0 (lower field) | bits 28:22 (upper field) |

The format is selected by the bufcntl.swap bit in the buffer control register. The default value 0 selects format A, whilst a value of 1 selects format B. The use of this swap facility, which is an advantageous rather than an essential feature, is that it allows for the compiler to simply increment the instruction and cause a DMA to a different region both for the buffers and for main memory. Without the swap facility, it would only be possible to achieve this (and so reduce the overhead for loop pipelining to one instruction) for one or the other.

The burst instructions are as substantially as for the first embodiment, but are changed in syntax and operation in view of the different architecture.

Storeburst is achieved by setting bits 31:30 to 00. This instruction indexes parameters in the MAT and BAT, which define the characteristics of the requested transfer. If the block_increment bit is set, the memaddr field of the indexed entry in the MAT is automatically updated when the transfer completes.

Loadburst is achieved by setting bits 31:30 to 01. This instruction also indexes parameters in the MAT and BAT, again which define the characteristics of the required transfer. As before, if the block_increment bit is set, the memaddr field of the indexed entry in the MAT is automatically updated when the transfer completes.

Sync, and also Null, is achieved by setting bits 31:30 to 11 and bits 29:0 to 0×FFFF_FFFF. The main purpose of this instruction is to provide a synchronisation mechanism between the execution of the software and the burst instructions. Writing a sync instruction to the burst instruction queue 30 prevents any other burst instruction from entering the queue: it locks them out. This means that there can only be one sync instruction in the queue at any one time, and also that reading of a sync instruction indicates that the queue is empty. The sync command does not initiate a DMA access but does activate the synchronisation mechanisms associated with the sync register. The use of sync instructions is discussed further below.

Memory Access Table (MAT) 65 will now be described with reference to FIG. 4. This is a memory descriptor table holding information relating to main memory locations involved in burst transactions. Each entry in the MAT is an indexed slot describing a transaction to main memory. In this embodiment, the MAT 65 comprises 16 entries, though different implementations are of course possible. Each entry comprises three fields:

1. Memory address (memaddr)—the start address of the relevant region in main memory. Ideally, this location is in physical memory space, as virtual address translation may result in a burst request spanning two physical pages, which would cause difficulties for the memory controller.
2. Extent (extent)—the extent of the transfer. This is the length of the transfer, multiplied by the stride, and gives the last address transferred plus one. The length of the transfer is calculated by the division of the extent by the stride, and this is automatically copied to the bufsize field of the related BAT 66 (see below) after a transfer has completed.
3. Stride (stride)—the interval between successive elements in a transfer.

Each of the fields may be read as a normal memory mapped register. Each register is 32 bits wide, but only selected fields are writable, as indicated in Table 5 below:

TABLE 5

Writable fields within MAT register

| memory access table register | writable field | comments |
|---|---|---|
| memaddr | bits [31:0] | no restrictions |
| extent | bits [10:0] | restricted to size of buffer area (2047) |
| stride | bits [9:0] | restricted to 1023 | memaddr: This is the 32 bit unsigned, word-aligned address of the first element of the channel burst. Illegally aligned values may be automatically aligned by truncation. Reads of this register return the value used for the burst (so if truncation was necessary, the truncated value is returned).

extent: The parameter in the extent register is the address offset covering the range of the burst transfer. If the transfer requires L elements separated by a stride of S, then the extent is S*L. When a burst is executed by the memory controller, if this value plus the memaddr value is greater than the size of the buffer area, then a bufcntl.buffer_overrrun_warn flag is set. The resultant burst wraps around to the beginning of the buffer area. The default value is 0, equal to no transfer.

stride: The parameter stride is the number of bytes skipped between accesses. Values of the transfer stride interval are restricted in the range of 1 to 1024. Values greater than 1024 are automatically truncated to 1024 and a bufcntl.stride_overrun_warn flag is set. Reads of this register return the value used for the burst (i.e. if truncation was necessary, then the truncated value is returned). Also, strides must be multiples of the memory bus width, which in this case is 4 bytes. Automatic truncation (without rounding) is performed to enforce this alignment. The default value provided is 0, equal to a stride length of 1.

An example of values contained by a MAT slot might be:

{0×1feelbad, 128, 16} which results in a 32 word (32 4 byte words) burst, with each word separated by 4 words (4 4 byte words).

The auto-stride indicator bit of a burst instruction also has relevance to the MAT 65. If this bit is set in the burst instruction, the start address entry is increased to point to point to the next memory location should the burst have continued past 32. This saves processor overhead in calculating the start address for the next burst in a long sequence of memory accesses.

The buffer access table (BAT) 66 will now be described with reference to FIG. 4. This is again a memory descriptor table, in this case holding information relating to the burst buffer memory area 26. Each entry in the BAT 66 describes a transaction to the burst buffer memory area 26. As for the MAT 65, the BAT 66 comprises 16 entries, though can of course be varied as for the MAT 65. Each entry in this case comprises two fields:

1. Buffer address (bufaddr)—the start of the buffer in the buffer area
2. Buffer size (bufsize)—the size of the buffer area used at the last transfer Again, each of the fields may be read and written as a normal memory mapped register. As for the MAT 65, each register is 32 bits wide, but only selected fields within the register are writable, as set out in Table 6 below. All unwritable bits are always read as zero.

TABLE 6

| buffer access table register | writable field | comments |
|---|---|---|
| bufaddr | bits [10:0] | limited by buffer area |
| bufsize | bits [10:0] | limited by buffer area - only written after a context switch |

The buffer address parameter bufaddr is the offset address for the first element of the channel-burst in the buffer area. The burst buffer area is physically mapped by hardware into a region of the processor's memory space. This means that the processor must use absolute addresses when accessing the burst buffer area. However, DMA transfers simply use the offset, so it is necessary for hardware to manage any address resolution required. Illegally aligned values may be automatically aligned by truncation. Reads of this register return the value used for the burst (i.e. if truncation was necessary, then the truncated value is returned). The default value is 0.

The parameter bufsize is the size of the region within the buffer area occupied by the most recent burst. This register is automatically set on the completion of a burst transfer which targeted its entry. Note that the value stored is the burst length, since a value of 0 indicates an unused buffer entry. This register may be written, but this is only useful after a context switch when buffers are saved and restored. The default value is again 0.

The remaining feature of the buffer controller 54 is the context table 62, shown in FIG. 4. This takes as input the indices of the burst instruction, and provides as output the corresponding slots to be used in the MAT 65 and the BAT 66. Entries in the context table 62 are used to control the region of entries accessed by burst instructions. Features of the context table 62 can in alternative embodiments can be embodied in software: use of the context table is advantageous for efficient management of the buffer architecture.

The context table is particularly useful in the case of "context switches". Three events which indicate the need to change the context of a system are an internal trap or exception, a thread switch signal, and an external interrupt (A thread is the basic unit of processor execution. It consists solely of the processor state needed for a single sequence of computation.). Any of these may establish a need to use resources in the burst buffer interface by a new thread. The context table minimizes the impact of such events by adding an extra level of indirection between system control and the MAT 65 and the BAT 66. Two or more code threads may be configured and compile time to use identical slot regions in the MAT 65 and BAT 66, and in order that they can execute without interference, they can be given by the operating system a different context identifier. The context identifier is written in the control register when the thread is activated, and using this mechanism, an offset added to the index value, configured at compile time so that each thread uses different slot regions within the tables. Provided that enough table resources are available, this prevents spilling and restoring the state of tables between context switches.

In the embodiment described, the context table 62 has 8 entries, though any positive integer value is possible according to implementation. Each entry comprises the following four fields:

1. Memory offset (memoffset)—this is the offset added to the MAT of a burst instruction after masking (see below). This is the value used to index the MAT 65.
2. Memory mask (memmask)—this is the mask applied to the MAT index field of a burst instruction before addition of an offset.
3. Buffer offset (bufoffset)—this is the offset added to the BAT of a burst instruction after masking (see below). This is the value used to index the BAT 66.
4. Buffer mask (bufmask)—this is the mask applied to the BAT index field of a burst instruction before addition of an offset.

The offset and mask registers allow a contiguous set of slots in the MAT and BAT to be defined, desirable as more than one burst buffer computation can be resident in the MAT 65 and BAT 66 at one time. The significance of the mask feature of the context table 62 is best considered with an example. A particular context may require the use of entries 2, 3, 4 and 5 of the buffer access table. Incrementing the burst instruction results in values increasing from, say, 10 to 20. Using a buffer mask of 3 then causes a pattern of the form 2, 3, 0, 1, 2, 3, 0, 1, 2, 3, 0. Using an offset of 2 then causes the pattern to index the required range of entries: 4, 5, 2, 3, 4, 5, 2, 3, 4, 5, 2. Another context may use another range of entries, which may be accessed using a separate context table entry. This method allows fast switching between contexts, which may include outer and inner loops. As described above, provision is provided in control register 52 and elsewhere in the buffer controller 54 for such context switches. However, it should be noted that these buffer resource management features could in alternative embodiments be realised in software.

The context table parameters are defined as follows:

memoffset: This parameter defines the offset used to access an entry in the MAT 65. As the table size is 16, the maximum value is 16. Higher values may automatically be truncated to 16, and negative values may be permitted.

memmask: This parameter defines the mask used to access an entry in the MAT 65. As the table size is 16, the maximum value permitted is 15. This corresponds to using the bottom 4 bits of the value, and any other bit sets are ignored.

bufoffset: This parameter defines the offset used to access an entry in the BAT 66. As the table size is 16, the maximum value is 16. Higher values may automatically be truncated to 16, and negative values may be permitted.

bufmask: This parameter defines the mask used to access an entry in the BAT 66. As the table size is 16, the maximum value permitted is 15. This corresponds to using the bottom 4 bits of the value, and any other bit sets are ignored.

The DMA controller 56 therefore receives from the buffer controller 54 instructions consisting of load or store, with an attached main memory address, stride and transfer length from MAT 65, and a buffer address from BAT 66. The requirements of the memory controller arrangements are that burst requests of the maximum size and stride defined for MAT 65 can be supported, that page boundary crossings can be handled in a transparent manner, and that a handshake signal can be provided to indicate when the transfer has completed.

The system as described here does not support virtual memory. However, the man skilled in the art will appreciate that with a DMA controller adapted to support virtual DMA, burst buffer architectures as described could be adapted to operate. A system substantially as described here could also be operated in an architecture containing memory caches: however, appropriate steps would need to be taken to ensure coherency between any such caches and main memory in the event of burst buffer operations.

A system of interrupts may be provided if, for example, burst buffer operation needs to be suspended to accommodate a higher priority DMA process. Warning flags may be set for assistance in debugging.

Since the architecture can be programmed to simultaneously burst data whilst the processor is computing, it is advantageous to be able to rename the burst buffers after each successive burst. This allows the processor to switch automatically from one buffer to an alternate buffer. In such a case, the one buffer would be used for the computation whilst the alternate buffer is being filled (via a burst instruction) for the next block of computation. After the burst and computation have completed, the buffers are renamed (swapped) and the process proceeds again.

For this, the BAT table can be extended to include 3 additional register fields;

Original fields: buffer_start_address, buffer_size,
New fields: buffer_offset_A, buffer_offset_B, Select_bit Here, the buffer_offset_A and buffer_offset_B are programmed by the compiler to contain two start addresses of two buffers of equal size. These buffers must exist in the dual port burst buffer memory 26. The Select_bit register contains 1 or 0; 1 signifies that buffer_offset_B address is selected and 0 in this field signifies that buffer_offset_A is selected. If an instruction is issued which references this BAT slot, then immediately after it has been written into the burst instruction queue 30, the select_bit is automatically inverted (or toggled) by the burst buffer controller. The burst buffer controller then copies the newly selected buffer_offset_X address to the buffer_start_address field (in the original BAT fields). It is this entry which is read by the program executing on the processor to indicate which buffer it will be using for computation. The instruction which was issued will at sometime later be taken from the burst instruction queue 30 and processed by the burst buffer architecture. At this time the buffer address which is passed to the DMA controller 56 is copied from the alternate buffer_offset_X address register which is not selected by the select_bit. i.e.

```
Select_bit = NOT Select_bit;
if (Select_bit == 1) {
   buffer_start_address = buffer_offset_A
   DMA_buffer_address = buffer_offset_B
}
else if (Select_bit == 0) {
   buffer_start_address = buffer_offset_B
   DMA_buffer_address = buffer_offset_A
}
```

The processing of burst instructions in the second embodiment of the architecture of the invention is discussed below with reference to FIG. 6.

A burst is initiated by issuance of a burst instruction. As indicated above, this contains an index to an entry in the MAT 65 and an index to an entry in the BAT 66. As indicated previously, MAT entries contain a start address in main memory, extent of the transfer and the stride, whereas BAT entries contain a target address in the buffer region 26 together with the length of the last transfer completed using this entry (which gives the buffer size).

This instruction is placed in the burst instruction queue 30, which resembles a first-in-first-out (FIFO) memory. This structure enables the decoupling between bursting data from DRAM and access of data by the processor to occur. This decoupling is necessary to achieve the performance gains of "prefetching"—the process of obtaining data from main memory before it is required by the processor, with the processor simultaneously acting on data obtained earlier. The processor passes instructions to the queue in a single cycle, and then continues operation. Burst instructions can thus be described as "non-blocking": they do not force the processor to stall until completion (however, in some embodiments the processor can be stalled in a case where the burst instruction queue 30 is full when a new burst instruction is issued until room for the new burst instruction becomes available). The burst instruction queue 30 is read by the DMA controller 56 which, when ready to access the main memory DRAM 14 on behalf of the burst instructions (i.e. when the burst buffer interface has priority), reads the next instruction in the queue and begins executing that instruction.

As shown in FIG. 6, this arrangement leads to four distinct places in burst instruction execution. Firstly, there is the "pending" phase directly after the instruction has been issued: the instruction is resident in the burst instruction queue 30. When the instruction has passed down the queue and is recognised by the DMA controller 56, the DMA process is performed: this is the "transfer" phase. After the transfer phase is completed, the contents of the burst buffer in the buffer region 26 and the corresponding region of main memory 14 are identical (and any warning flags relevant to the transaction are set): the burst buffer is then said to be "valid" and this initiates the "valid" phase of execution. This continues until some event occurs to change the relationship of the burst buffer in the buffer region 26 to the corresponding area of main memory 14: now the burst buffer is said to be "invalid" and the execution is in the final "invalid" stage.

Issuing of the instruction defines an association between a physical buffer and a region of main memory, this binding thus only occurring at run time when the instruction is executed. This binding at run-time is central to the flexibility and low processor instruction overhead incurred when using this architecture. There is no maintained association between the two, allowing for buffer renaming and reuse.

During the transfer phase, the architecture labels the instruction accordingly with the bufcntl.transfer bit. Other phases are tracked or trackable through the software.

Entry into the valid phase is, as indicated above, the indication that the burst transfer indicated in the relevant burst instruction has completed. This can be detected by the software by the issue of a sync instruction immediately after the burst instruction. As indicated above, the burst instruction queue 30 can only contain one sync instruction at one time, and no further burst instructions can be written to the queue while it contains a sync instruction. There are thus three methods available for performing synchronisation using sync:

1. Issue sync instruction and read the sync register. The read is blocked until all burst instructions in the queue have completed and the sync instruction emerges.
2. Issue sync instruction and then write another burst instruction to the queue. This time, the write is blocked until all burst instructions in the queue have completed and the sync instruction emerges.
3. Issue sync instruction and poll the lastcmd register for the sync instruction.

Methods 1 and 2 block the processor, whereas method 3 does not.

Once the buffer region is in its valid phase, the processor may operate on the data it contains. In this embodiment, the processor may access the data in the buffer using byte, halfword and word accesses.

A process for compiling source code to the second embodiment of the computer system according to the invention will now be described (this process is an embodiment of a further aspect of the invention.)

The burst buffer architecture identified is particularly effective for handling regular simple loop structures involving simple operations repeated on large arrays of data: such loop structures may, for example, be frequently found in media computation. Compilation of relevant code to the burst buffer architecture involves identification of relevant loops in source code, and reconstruction of the loops so that they will perform the original operation correctly utilising burst buffers.

Relevant loops can be identified by hand. Alternatively, appropriate loops can be identified by known techniques (see, for example, "Compiler Transformations for High-Performance Computing", David F. Bacon, Susan L. Graham and Oliver J. Sharp, Technical Report No. UCB/CSD-93-781, University of California, Berkeley). Once identified, it is necessary for the loops to be translated correctly into a form which can be utilised by the burst buffers.

The identified code is in the form of a loop. To be processed through the burst buffers, the loop needs to be "unrolled" into a series of chunks, each the size of a burst. It is then possible to define handling of the loop by the architecture in terms of a series of burst loads and stores. However, as burst buffers are a resource controlled by software, it is necessary to allocate buffers before a load or store burst instruction is issued, and also before a buffer is used as a target for computation. Following the loads and allocations, the computation may be performed: these may be on the unrolled version of the identified loops, or, if the loops are small enough (no larger than a burst) on the loops themselves. Immediately after computation, storebursts may be used to store the buffers and the input buffers freed. Once the storebursts are completed, the output buffers can also be freed.

For example, the following code:

```
for(i=0;i<imax;i++){
    x[i] = f(a[i],b[i],c[i]);
    y[i] = g(a[i],b[i],c[i]);
}
``` containing three input streams, a[i], b[i] and c[i], and two output streams, x[i] and y[i], where imax is assumed to be very large and typically greater than the burst size, transforms as follows:

```
/* do main body of loop using bursts */
for(i=0;i<imax;i+=burst_size){
   alloc A;                    /* alloc buffer A for stream a[i] */
   loadburst A(i,burst_size,1);   /* start, length, stride */
   alloc B;                    /* alloc buffer B for stream b[i] */
   loadburst B(i,burst_size,1);   /* start, length, stride */
   alloc C;                    /* alloc buffer C for stream c[i] */
   loadburst C(i,burst_size,1);   /* start, length, stride */
   alloc X;                    /* alloc buffer for compute of stream x[i] */
```

-continued

```
   alloc Y;                    /* alloc buffer for compute of stream y[i] */
   for(j=0;j<burst_size;j++){
      x[i+j]=f(a[i+j],b[i+j],c[i+j]); /* perform computes - references
                                         hit in buffers */
   }
   for(j=0;j<burst_size;j++){
      y[i+j]=g(a[i+j],b[i+j],c[i+j]);
   }
   free A;                 /* free input buffer as compute has completed */
   free B;                 /* free input buffer as compute has completed */
   free C;                 /* free input buffer as compute has completed */
   storeburst X(i,burst_size,1);   /* start, length, stride */
   storeburst Y(i,burst_size,1);   /* start, length, stride */
   free X;                 /* free output buffer after store completed */
   free Y;                 /* free output buffer after store completed */
}
/* do tail (when imax%burst_size != 0) */
for(i=imax/burst_size;i<imax;i++){
   x[i]=f(a[i],b[i],c[i]);
   y[i]=g(a[i],b[i],c[i]);
}
```

The dependency graph associated with this transformed code is shown in FIG. 7. For example, note that the computation targetted at buffer 04 depends not only on the loadbursts of buffers 01, 02 and 03, but also on the allocation of output buffer 04 itself. The numbers in parentheses on FIG. 7 are node identifiers.

The code as transformed here provides a simple, but relatively inefficient, schedule. This is because the available parallelism has not been exploited (when the code is issuing bursts, computations are not being performed and vice versa). Analysis of the dependency graph can be used to drive a scheduling program which produces better schedules, with the improvement being provided through use of additional burst buffers. The minimum number of burst buffers required is one for each input stream, plus another for performing a computation (which after the computation is complete can be emptied, freed and allocated for the next computation). Through consideration of list scheduling and buffer allocation, improved schedules can be found. The solutions can be measured to optimise burst efficiency in order to use the DRAM memory bandwidth as efficiently as possible. This differs from normal computation strategy, which is directed to maximising computation efficiency: the different approach arises as the main constraint for the systems under consideration is that they are "bandwidth-bound".

In addition to managing the buffer allocation, the memory and the buffer access tables support buffer renaming. One of the objectives of the compiler is to transform loops using a process called strip-mining to expose potential bursts. Once the loops have been strip-mined, a further process called modulo scheduling (or software pipelining) may be applied. This latter process requires that the buffers are renamed within the partially unrolled loop at particular points. For example, a loop computation may require that a logical buffer named 'A' is cyclically mapped from physical buffer '2' to buffer '5'. In this example, one physical buffer could be used for bursting to memory whilst the other buffer is being accessed by the processor for computation. The burst operation and computation operate concurrently, hence improving performance.

A further function that must be performed by the compiler is the conversion of sized-bursts in the software to channel-bursts, as only bursts with the width of the memory bus width (in the present case, 32 bits) can be processed by the burst architecture. During compilation, the sized-bursts found in the software must be mapped to channel-bursts, with special provision being taken, if necessary, for corner cases.

Typical simple examples of the use of the burst buffer system 24 will now be described. First, it may be used as a local data buffer, wherein a region of memory the size of the buffer is mapped directly into a burst buffer 40. This may be done in two ways: (1) if the data is uninitialised, then the allocbuffer command may be used to get a buffer 40 and perform the address mapping; and (2) if the data is initialised in the main memory 14, then a loadburst command must be used to copy the data into the burst buffer 40. Once the mapping is done, the processor 10 may continue to access the same addresses and they will be captured by the buffer 40. At completion, or when the system needs to be made coherent, a storebuffer command is used. Second, burst buffer system 24 may be used as a look-up table. In much the same way as the local data buffer, the burst buffer 40 may be initialised with look-up table data using a loadburst command. References to addresses that hit in the buffer return the appropriate data. The table size is limited, although there is no reason why a bigger table could not partially reside in the buffer 40 and the rest in the main memory 14. If the area held in the buffer 40 is the most frequently used, then this will help improve performance. Coherency is not an issue in this case. Therefore, once the use of the table has been completed, a freebuffer command should be issued.

A possible restriction on the system described above is that the burst buffers 40 may not be able to be used as a simple FIFOs. Addresses must always be used to access data in the buffers. It would be possible to write a software "wrapper" which would make the buffer appear as if it were a FIFO. However, the deferral count may be used to emulate FIFO functionality in that load and store bursts may be deferred by the buffer size which would mean that a store burst would be issued when the buffer had been logically filled.

In typical operation of the embodiments described above, a burst of data is read from the main memory 14 into the burst buffer memory 26, processed by the processor 10/processor interface 12 and returned to the burst buffer memory 26, and then written to the main memory 14. In another embodiment, instead of the processing being performed by the processor 10/processor interface 12, it is instead performed by a dedicated computation engine which is connected to the burst buffer memory 26.

It will be appreciated that many other modifications may be made to the embodiments of the invention described above and within the scope of the invention.

What is claimed is:

1. A method of operating a computer system having a processor, a main memory and at least one data buffer, the method comprising the steps of:

identifying in source code computational elements relating to a plurality of related locations in main memory and suitable for compilation to, and execution with assistance of, said at least one data buffer;

transforming the identified computational elements in the source code to a series of operations each involving a memory transaction no larger than the size of the at least one data buffer, and expressing such operations as burst instructions to transfer data to or from a plurality of related locations in main memory in one data burst; and executing a source code by the processing system, wherein the identified computational elements are processed by the processor through accesses to the at least one data buffer.

2. A new method of operating a computer system as claimed in claim 1, wherein data required by an identified computational element is fetched from memory to the at least one data buffer before it is required by the processing system.

3. A method of operating a computer system as claimed in claim 1, wherein means are provided to stall the processing system until a transaction between memory and the at least one data buffer is completed.

4. A method of operating a computer system wherein the operated computer includes a burst instruction controller responsive to burst instructions to direct a memory access controller to transfer a plurality of data words between a memory and at least one data buffer in a single data burst, wherein in a data burst a row of memory locations in the memory is selected, and a sequence of accesses local to that row is performed; and a burst instruction queue for queuing burst instructions so that such a burst instruction can be made available for execution by the memory access controller immediately after a preceding burst instruction has been executed, the method comprising the steps of:

identifying in source code computational elements suitable for compilation to, and execution with assistance of, the at least one data buffer;

transforming the identified computational elements in the source code to a series of operations each involving a memory transaction no larger than the size of the at least one data buffer, and expressing such operations as burst instructions; and executing a source code by the processing system, wherein the identified computational elements are processed by the processing system through accesses to the at least one data buffer.

5. A method as claimed in claim 1, wherein the plurality of locations in main memory are locations in a common row of the memory.

6. A method as claimed in claims 5, wherein the memory is a dynamic random access memory.

7. A method as claimed in claims 1, wherein the memory is a dynamic random access memory.

8. A method as claimed in claim 1, wherein said burst instructions are provided to a burst instruction queue for execution by a burst instruction controller adapted to direct a memory access controller to transfer a plurality of data words between a memory and the at least one data buffer in a single data burst.

9. A method as claimed in claim 8, wherein a single data burst a row of memory locations in the memory is selected, and a sequence of accesses local to that row is performed.

* * * * *

UNITED STATES PATENT AND TRADEMARK OFFICE
CERTIFICATE OF CORRECTION

PATENT NO. : 6,336,154 B1
DATED : June 20, 2000
INVENTOR(S) : Dominic Paul McCarthy et al.

It is certified that error appears in the above-identified patent and that said Letters Patent is hereby corrected as shown below:

Column 26,
Line 47, change "claims 5" to -- claim 5 --.
Line 49, change "claims 1" to -- claim 1 --.

Signed and Sealed this

Sixth Day of September, 2005

JON W. DUDAS
*Director of the United States Patent and Trademark Office*